July 17, 1962 L. M. FORSTER 3,044,316
CONTINUOUSLY VARIABLE TRANSMISSION AND AUTOMATIC CONTROL
Filed Jan. 7, 1955 8 Sheets-Sheet 1

INVENTOR.
LLOYD M. FORSTER
BY
ATTORNEYS

July 17, 1962 L. M. FORSTER 3,044,316
CONTINUOUSLY VARIABLE TRANSMISSION AND AUTOMATIC CONTROL
Filed Jan. 7, 1955 8 Sheets-Sheet 2

INVENTOR.
LLOYD M. FORSTER
BY
ATTORNEYS

July 17, 1962 L. M. FORSTER 3,044,316
CONTINUOUSLY VARIABLE TRANSMISSION AND AUTOMATIC CONTROL
Filed Jan. 7, 1955 8 Sheets-Sheet 6

INVENTOR.
LLOYD M. FORSTER
BY
ATTORNEYS

July 17, 1962 L. M. FORSTER 3,044,316
CONTINUOUSLY VARIABLE TRANSMISSION AND AUTOMATIC CONTROL
Filed Jan. 7, 1955 8 Sheets-Sheet 7

INVENTOR.
LLOYD M. FORSTER
BY
Harley Forster & Harley
ATTORNEYS

July 17, 1962 L. M. FORSTER 3,044,316
CONTINUOUSLY VARIABLE TRANSMISSION AND AUTOMATIC CONTROL
Filed Jan. 7, 1955 8 Sheets-Sheet 8

FIG. 24

INVENTOR.
LLOYD M. FORSTER
BY
*Farley, Forster & Farley*

ATTORNEYS

3,044,316
CONTINUOUSLY VARIABLE TRANSMISSION AND AUTOMATIC CONTROL
Lloyd M. Forster, 19400 Thirteen Mile Road, Birmingham, Mich.
Filed Jan. 7, 1955, Ser. No. 480,444
41 Claims. (Cl. 74—472)

This invention relates to a high power capacity steel V belt, a transmission system of fluid pressure operated variable V pulleys, and an automatic control system adapted for use in automotive vehicles.

The end objects as applied to automotive vehicles include improvement in fuel economy, acceleration performance, engine life, smoothness and quietness of operation, reduction in foot braking requirements, and reduction in manufacturing cost relative to present commercially produced automatic transmissions.

The basic means for accomplishing these objects include a high power capacity, uniformly efficient, continuously variable transmission having a wide range of positively controllable ratio variation together with automatic ratio control means for effecting each optimum engine speed for meeting each prevailing power requirement at any prevailing vehicle speed as well as for providing desired accelerator controlled engine braking utilizing transmission ratio variation.

More specifically, the preferred embodiment of the transmission incorporates an endless flexible steel belt having transversely supporting steel struts adapted to engage variable V pulleys positioned by fluid pressure means together with an automatic fluid pressure actuated ratio control system. The belt is preferably constructed with a continuous flexible seamless and jointless flat spring steel band adapted to withstand bending and tensile stresses arising from maximum torque and speed requirements without exceeding fatigue limits of the band and the transverse steel struts preferably attached to the inner surface are adapted to withstand buckling loads arising from pressure engagement of the pulley faces under belt tension and provide a maximum number of frictional contact points for transmitting drive between pulley and belt.

The preferred ratio control system is differentially responsive to engine speed and power demand. Accelerator position is employed as an indicator of power demand which produces through actuation of a differential valve any necessary ratio change to effect a corresponding optimum engine speed for meeting such power demand. An engine speed responsive element of the control restores such valve to a balanced condition when an engine speed corresponding to a given power demand is reached. Throttle opening is coordinated with accelerator position and engine speed for optimum efficiency and performance, and is preferably maintained at a relatively open position corresponding to high torque output throughout a major portion of accelerator travel.

In conventional hand shift and automatic transmissions commercially produced for automotive vehicles in this country at the present time, ratio changes are employed primarily in accelerating the vehicle from a standstill to a suitable road speed whereafter normal changes in power requirements are met through variations in throttle opening in a fixed final drive ratio. There are certain exceptions, as in the case of torque converters which are not locked out in final drive and provide some slight torque multiplication at low driving speeds under open throttle conditions, or, as in the case of manual or automatic downshifts to meet unusual requirements. However, for the most part, increased power requirements for acceleration and/or hill climbing are met in the final drive ratio through variation in throttle opening. This necessitates a basic compromise with engine efficiency, which is maximum for any given power requirement within its capacity only under high torque loading at or near wide open throttle, and also renders maximum engine power unavailable except under the infrequent condition when the vehicle speed in final drive ratio (or a downshift ratio) happens to correspond to the maximum power speed of the engine.

Thus, while it is known that an internal combustion engine delivers power most efficiently under high torque load at or near wide-open throttle, selection of a fixed final drive ratio which would permit maximum efficiency of engine operation at sustained driving speeds would leave no adequate torque reserve for acceleration and/or hill climbing and would necessitate intolerably frequent and abrupt downshifts to fixed lower speed gear ratios. Accordingly, in order to maintain an adequate torque reserve to meet normal acceleration and/or hill climbing requirements subject to the control of increased throttle opening, a final drive ratio is necessarily chosen which causes the engine to run with fractional torque output at speeds far in excess of its optimum efficiency speeds in delivering the power requirements for normal sustained road load operation. Even in the case of overdrive transmissions or so-called "Dual-Range" automatic transmissions designed for relatively economical low engine speed operation, a torque reserve for acceleration must be maintained to avoid unduly frequent downshifts and any gain in operating economy is accompanied by a corresponding loss in torque reserve for acceleration.

The present transmission and control provide a basically different approach directed to substantially eliminate this compromise. They are constructed on the theory that any given internal combustion engine is inherently capable of producing any intermediate power requirement over a wide range of engine speeds, i.e., at relatively low engine speed and high torque or higher engine speed and lower torque; that for each particular power output requirement within its maximum rated horsepower a particular corresponding optimum engine speed exists from the standpoint of economy, quietness of operation, engine life, etc.; that such inherent optimum engine speed will normally occur with high torque output at or near wide-open throttle; that an optimum engine speed versus power output curve may be plotted for any make of engine which would range from zero power output at idling speed to maximum rated horsepower at a corresponding high engine speed and which would be developed with the engine delivering high torque at or near wide-open throttle throughout most of the range; that by providing an efficient, positively controllable, continuously variable transmission capable of changing ratio over a wide range smoothly and rapidly under power, the engine may be made to run at substantially optimum speeds for delivering power requirements in accordance with its particular optimum performance curve under normal sustained driving conditions without depending on reserve torque for acceleration; and that by automatically meeting requirements for acceleration and/or hill climbing through continuous change of ratio and increase in engine speed under power, any power output within full rated horsepower may be rendered available to meet any driving condition without abrupt downshift or unpleasant effect of any kind.

From a control standpoint instead of employing an accelerator which progressively opens the throttle at a more or less uniform rate throughout its travel, the present system preferably utilizes an accelerator linkage which primarily controls engine speed through variation in transmission ratio and secondarily controls throttle opening in relation to such engine speed and the optimum power output curve characteristics of the engine. Thus, the accelerator travel is preferably divided into approximately equal increments of progressive power demand, each having a corresponding optimum engine speed under the engine's performance curve. Each position of the accelerator will accordingly correspond to a particular power output at a particular engine speed which is established and maintained primarily through transmission ratio control and the throttle opening may be substantially constant at or near a wide-open position throughout a major portion of the accelerator travel. In order to realize maximum advantages from such a transmission and control, maximum speed (overdrive) ratios of a high order compared with conventional final drive ratios may be utilized which more fully load the engine under normal sustained road load driving conditions.

In order to provide for controlled engine braking which will utilize the lower speed ratios, a release range of accelerator travel beyond the zero power output position may be provided which calls for progressively higher engine speeds at closed throttle thereby causing the transmission ratio to change as required to maintain engine speeds corresponding to any desired degree of engine braking. Or, as a preferred alternative, the engine braking accelerator travel may be graduated in increments of deceleration up to any desired predetermined maximum and adapted to cooperate differentially with a decelerometer control for establishing and maintaining ratios suitable to produce desired deceleration. With the latter control it is made possible, for example, to coast down a hill of any variable grade and maintain a constant speed or rate of of deceleration by holding the accelerator in a corresponding fixed position.

From the above brief description it will be understood that an important object of the present invention is to realize improved fuel economy through the provision of a transmission and control capable of maintaining substantially optimum engine speed for meeting various sustained road load power requirements relying on continuous ratio change to provide higher engine speed where increased power requirements for acceleration and/or hill climbing are encountered rather than on a high reserve torque capacity at the prevailing engine speed.

Another object is to provide constant availability of any engine power up to full maximum to meet high power requirements using continuous ratio change under power to effect optimum engine speeds for meeting such power requirements without limitation by prevailing vehicle speed.

Another object is to provide a transmission capable of positively controllable, completely smooth ratio change under power over a wide range with uniformly high transmission efficiency.

Another object is to provide a transmission capable of improving engine quietness and life by permitting it to run at more nearly optimum speeds for meeting normal sustained driving requirements, and never permitting it to run at speeds exceeding its maximum rated horsepower speed.

Another object is to provide a transmission capable of reducing foot braking requirements by rendering continuous ratio change under accelerator control available to produce desired engine braking.

Another object is to provide a high power capacity steel V belt construction.

Another object is to provide a compact, high power capacity, continuously variable V belt transmission.

Another object is to adapt such transmission to meet the torque, speed, ratio, size, durability and cost requirements of an automotive vehicle transmission.

Another object is to provide a fluid pressure actuated variable V pulley construction adapted for use with an automatic fluid pressure ratio control.

Another object is to provide an improved automatic control system adapted for use with a continuously variable transmission.

Another object is to provide an automatic control utilizing ratio variation as a means for controlling engine speed under relatively constant throttle opening.

Another object is to provide an automatic control differentially responsive to engine speed and accelerator position for controlling ratio variation under relatively constant throttle opening.

Another object is to provide means responsive to accelerator actuation for coordinating throttle opening with engine speed and power requirements.

Another object is to adapt such accelerator control to provide desired engine braking under various transmission ratios.

These and other objects will be more apparent from the following detailed description of a preferred embodiment of my invention and from an examination of the drawings illustrating such embodiment wherein:

FIG. 6 is a torque versus engine speed graph on which progressive constant horsepower curves are plotted together with typical passenger car road load power and full torque curves.

Figure 1:
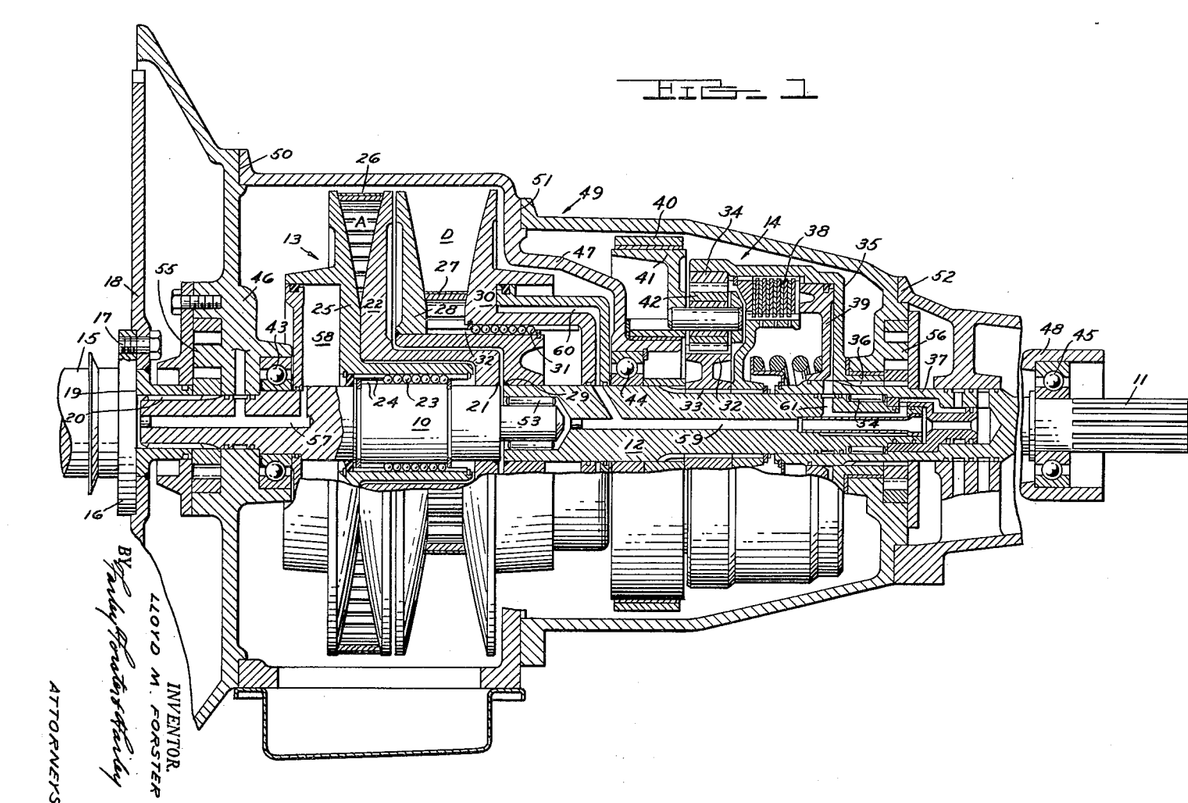
FIG. 1 is a sectional side elevation of the present transmission constructed to meet typical passenger car transmission power and space requirements.
Figure 2:
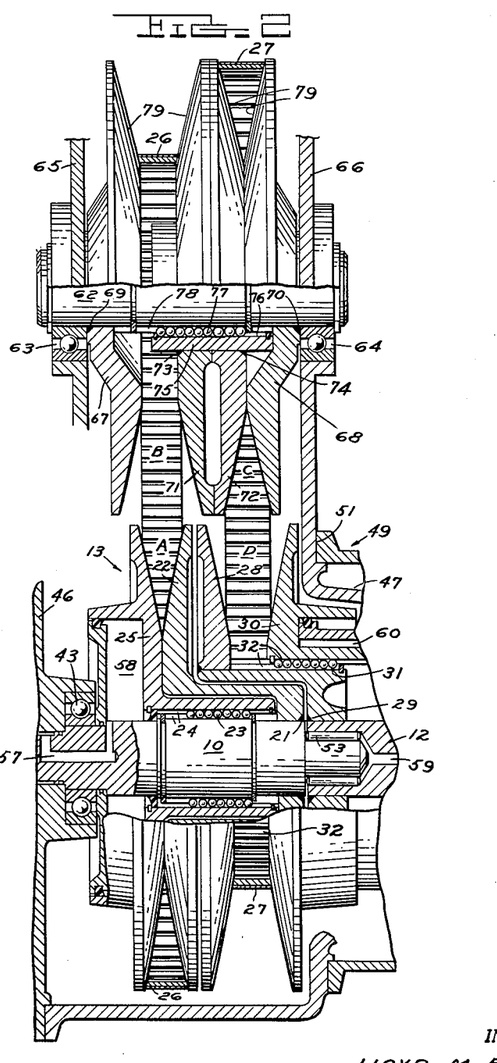
FIG. 2 is a sectional elevation taken along the centerlines of the mainshaft and a lower laterally disposed countershaft showing the preferred variable pulley system employed in such transmission.

Referring to FIGS. 1 and 2, a typical embodiment of the present transmission comprises generally an input shaft 10, a tail shaft 11, an intermediate shaft 12, a fluid pressure actuated system of variable ratio, V belt driven pulleys 13 for delivering power from the input shaft 10 to the intermediate shaft 12 and a simple planetary gear set 14 for delivering forward or reverse drive from the intermediate shaft 12 to the tail shaft 11.

Figures 3, 4, 16, 17:
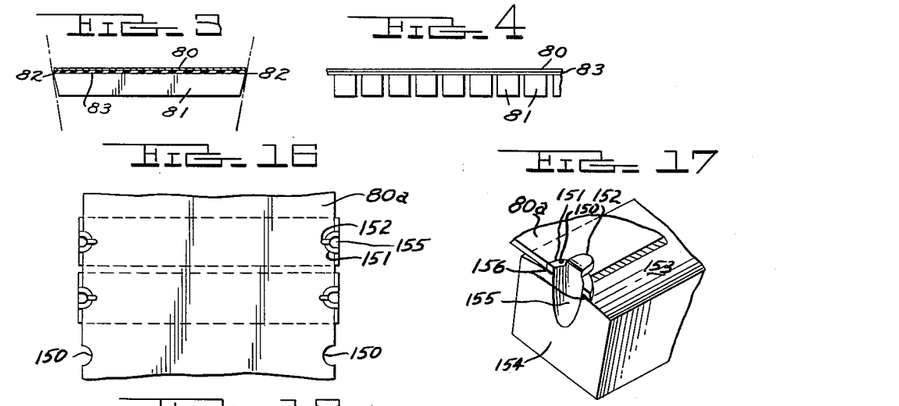
FIG. 3 is an enlarged sectional view of the preferred V belt construction.
FIG. 4 is an enlarged edge view of such preferred V belt construction.
FIG. 16 is an enlarged fragmentary face view of a modified belt construction.
FIG. 17 is a further enlarged fragmentary perspective view showing the mechanical drive connection between strut and belt for the modified construction of FIG. 16.

The input shaft 10 is directly driven by the engine crank shaft 15 through flange 16 bolted at 17 to fly wheel 18 and an integral hub 19 splined at 20 to the forward end of the input shaft 10. Four variable pulley sets are employed including the input set A, two intermediate countershaft sets B and C, and the output set D. Drive is delivered from the input shaft 10 to the input pulley set A as through an integral welded connection 21 with an axially stationary pulley half 22 and by means of a ball 23 spline 24 drive to an axially movable pulley half 25. The input pulley set A delivers power to the countershaft pulley set B through a steel V belt 26, the preferred embodiment of which as shown in FIGS. 3 and 4 and later described in detail, comprises an endless seamless jointless flexible spring steel band 80 joined to transverse steel struts 81 by a rubber interlay 83 vulcanized to the adjacent surfaces of struts and band, the struts contacting the pulley faces at points 82 adjacent the line of drive. Pulley set C which is rotatably connected to pulley set B likewise drives pulley set D through a similar steel V belt 27. An axially stationary half 28 of the pulley set D is fixed as by weld 29 to the intermediate shaft 12 while an axially movable half 30 of the pulley set D is drivingly connected to the axially fixed half 28 through ball 31 spline 32 drive means.

Referring to the planetary gear set 14, a sun gear 32 is splined at 33 to the intermediate shaft 12 while a ring gear 34 transmits torque through the integral clutch housing 35 splined at 36 to a forward tubular extension 37 of the tail shaft 11. A clutch 38, when actuated by fluid pressure on piston 39, establishes direct forward drive between the intermediate shaft 12 and tail shaft 11 while, with such clutch released, engagement of the brake 40 by fluid pressure means, not shown, holds a planet carrier 41 and establishes a reverse drive through the sun gear 32, planet pinions 42 and ring gear 34 between the intermediate shaft 12 and tail shaft 11.

Thus the pulley system and intermediate shaft 12 preferably are driven at all times when the engine is running, clutch 38 being engaged to establish forward drive, or brake 40 being engaged to establish reverse drive, or both of such elements being released to interrupt drive between the intermediate shaft 12 and tail shaft 11 when the transmission is in neutral.

The respective input, intermediate and tail shafts are supported in three main bearings 43, 44 and 45 in the respective forward wall 46, intermediate wall 47 and tail shaft extension wall 48 of the transmission housing 49 which is bolted together in suitable sections at 50, 51 and 52. Needle bearings 53 and 54 pilot the respective input, intermediate and tail shafts within the main bearings 43, 44 and 45.

Referring particularly to FIG. 2, it will be seen that a countershaft 62 rotates in bearings 63, 64 supported respectively in fixed walls 65, 66, such countershaft carrying a pair of axially fixed outer pulley halves 67, 68, suitably secured as by welds 69 and 70 to the countershaft 62, as well as a pair of axially movable pulley halves 71, 72 suitably fixed as by welds 73, 74 to a cylindrical hub 75 having internal splines 76 for producing driving engagement through balls 77 with external splines 78 formed on the surface of the countershaft 62. With this arrangement, it will be understood that the center pulley halves 71, 72 will float axially on their common antifriction bearing while all four pulley halves on the countershaft are drivingly connected for conjoint rotation.

Shifting of the pulleys from the position shown, which corresponds to an extreme overdrive position, may be effected by introducing additional pressure in the cylinder 60 while the pulleys are running, thereby moving the belt 27 outwardly on the pulley set D causing such belt to move inwardly on the countershaft pulley set C thereby shifting the pulley halves 71, 72 to the left as seen in FIG. 2 which in turn will move the belt 26 outwardly on the pulley halves 67, 71 and inwardly on the pulley set A as permitted by movement of the pulley half 25 against the relatively lighter back tensioning pressure maintained in cylinder 58. By reducing the pressure in chamber 60 to such back tensioning pressure and increasing the pressure in cylinder 58, an opposite shifting of the pulleys may likewise be effected.

An input shaft driven pump 55 and tail shaft driven pump 56 supply oil pressure for actuating the clutch 38, brake 40 and shifting pulley cylinders 58, and 60. Four main oil passages are provided for the respective fluid pressure operated elements including passage 57 for supplying oil pressure to cylinder 58 in the axially movable pulley half 25, passage 59 for supplying pressure to cylinder chamber 60 in the movable pulley half 30, passage 61 for supplying pressure to the clutch piston 39 and a fourth passage, not shown, for supplying pressure to actuate brake 40.

Figure 5:
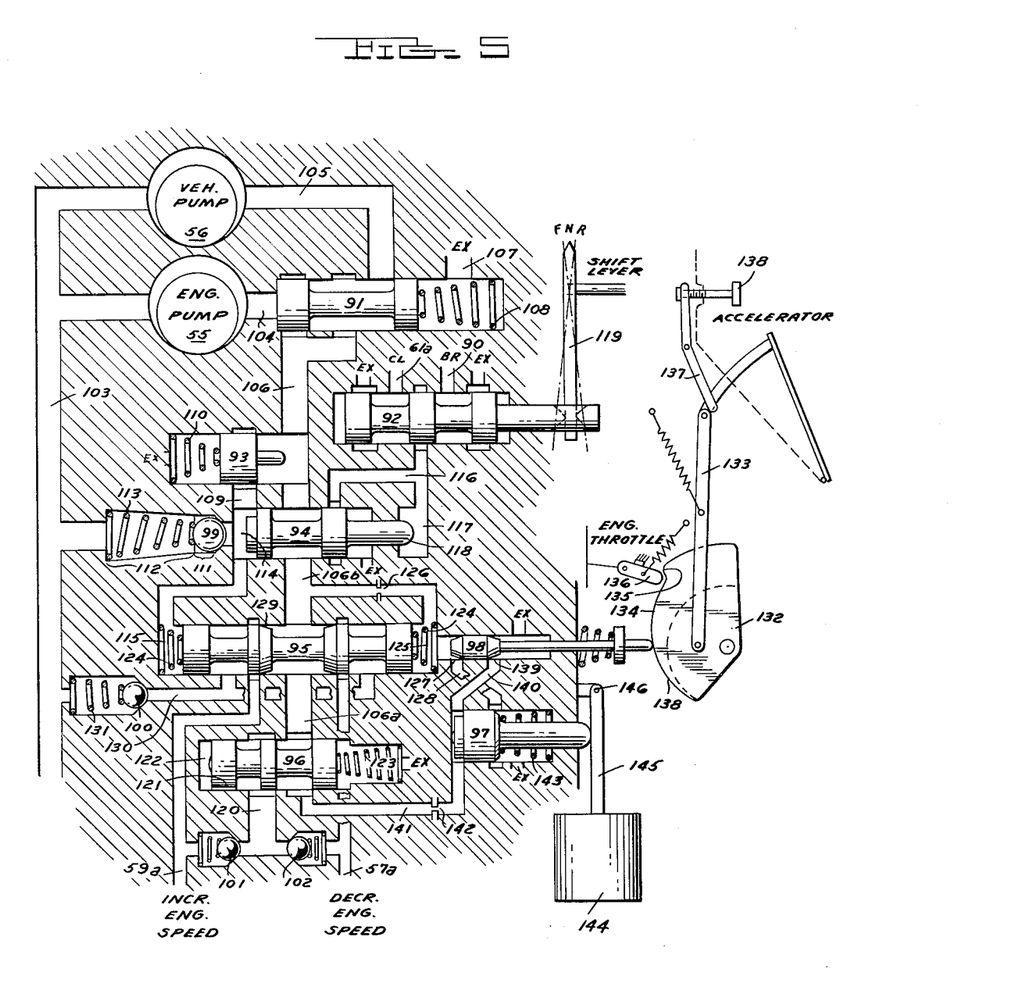
FIG. 5 is a schematic diagram of the preferred automatic fluid pressure control system adapted for use with the preferred transmission in a typical automotive vehicle application.

Referring to the fluid pressure control system shown in FIG. 5, it will be understood that the various controls are directed to supply either belt tensioning or shifting pressure for increasing engine speed as required to the passage 59a communicating with the passage 59 leading to cylinder 60; to supply belt tensioning or shifting pressure for decreasing engine speed to the passage 57a communicating with the passage 57 supplying pressure to the cylinder 58; and to supply pressure to the passage 61a communicating with passage 61 for engaging the clutch 38 to establish forward drive or to the passage 90 communicating with the brake cylinder, not shown, for engaging the brake 40 to establish reverse drive.

The preferred control system shown includes generally a combination of cylindrical spool-type valves including a vehicle pump unloading valve 91, a manual shift valve 92, a line pressure regulating valve 93, a clutch engaging pressure regulating valve 94, a ratio control valve 95, a belt tensioning pressure regulating valve 96, an engine braking valve 97, and an accelerator responsive orifice control valve 98. In addition, four ball-type check valves are employed including a variable orice control valve 99, a belt tensioning pressure relief valve 100 and a pair of cross check valves 101, 102.

The engine driven pump 55 and vehicle driven pump 56 draw oil from sump line 103 and discharge respectively into delivery lines 104 and 105. Whenever the engine is running, line pressure in passage 104 moves and holds the valve 91 to the right to block communication between passage 105 and the main line pressure passage 106 and connects the vehicle pump output passage 105 directly with a wide-open exhaust passage 107 thereby to minimize pumping energy losses through the vehicle pump throughout all normal operations when the engine is running. The load of spring 108 is such as to establish a sufficient pressure for push starting requirements before the exhaust port 107 is uncovered and such as to fully uncover the exhaust port to vehicle pump discharge when normal line pressure acts on the valve 91. Such normal line pressure is established by pressure regulating valve 93 which open the main engine pump discharge return passage 109 only after normal line pressure has overcome spring 110. The only additional outlets for the line pressure comprise restricted flow outlets through relatively small control orifices, flow required to shift the speed ratio, engage the clutch or brake, valve leakage flow and flow through any lubricating passages, not shown.

The main engine pump discharge through passage 109 has a return passage to sump line 103 solely through the variable orifice control valve 99 wherein the ball chamber is provided with short straight cylindrical section 111 and a conically tapered section 112. The clearance between the ball and straight section 111 establishes a restricted orifice passage which, together with the resistance of spring 113, establish a control pressure in the chamber 114 acting on valve 94 which increases substantially with the square of the engine speed while, after the ball has passed the straight cylindrical section 111 and enters the tapered conical section 112, the progressively increasing orifice area establishes a control pressure which increases more gradually and may, through coordination of the taper angle and rate of spring 113 yield a control pressure varying more nearly directly with engine speed.

The initial control pressure varying with the square of the engine speed is employed to effect initial engagement of the clutch for forward drive or brake or reverse drive through the pressure regulating valve 94 and shift valve 92. Thus, control pressure in chamber 114 acting on the valve 94 moves such valve to the right admitting line pressure from passage 106 to the clutch or brake apply passage 116 which in turn communicates with the chamber 117 acting on a reduced area of valve extension 118 which in turn limits the clutch or brake actuating pressure in the passage 116 to a multiple value of the control pressure in chamber 114 proportional to the differential areas of the main valve 94 and valve extension 118. Through such control means it is possible to establish full clutch or brake engagement under a pressure increasing with the square of engine speed corresponding in effect to a centrifugal clutch engagement suitable for smooth starting, such clutch or brake being fully engaged when the ball of valve 99 leaves the constant orifice range 111.

It will, of course, be understood that when the shift valve 92 is in neutral position as shown, both clutch passage 61a and brake passage 90 communicate with exhaust ports while the actuating pressure in passage 116 is blocked and that when the valve 92 is shifted through lever 119 to a forward position, actuating pressure will be admitted from passage 116 to clutch passage 61a, or when the shift lever 119 is moved to a reverse position, actuating pressure from the passage 116 will be admitted to brake passage 90. Thus, when the engine is started with the shift lever in neutral position, both the clutch and brake are fully released, regardless of engine speed. However, when the shift lever is moved to a forward position, for example, pressure is admitted to the clutch passage 61a which will increase with the square of the engine speed. The control valve 99 may be adjusted so that when the engine is idling, pressure just sufficient to overcome or partially overcome the clutch release springs will be established so that upon any acceleration of the engine, gradual clutch engagement may be promptly and smoothly effected under pressure increasing with the square of engine speed.

Line pressure in passage 106a supplies belt tensioning pressure to each of the pressure actuated pulley cylinders through regulating valve 96 which limits the belt tensioning pressure in passage 120 to that established by spring 123, the pressure in passage 120 communicating through groove 121 at the left end of the valve 96 with the chamber 122 moving the valve against spring 123 to close off flow through the valve when the pressure required to maintain adequate tensioning for the belts 26 and 27 is established in passage 120. Lightly loaded check valves 101 and 102 admit such belt tensioning pressure to both passages 59a and 57a leading to the respective cylinders 60 and 58, while preventing cross flow when a higher actuating pressure is admitted to either passage.

The ratio control valve 95 is biased to a neutral position by light springs 124 at either end of the valve. As previously explained, an engine speed responsive control pressure is admitted to chamber 114 which also communicates with chamber 115 at the left end of valve 95 while an accelerator responsive control pressure is admitted to chamber 125 at the right end of such valve. The latter control pressure is established by line pressure from passage 106b passing through a relatively small fixed orifice 126 and a variable orifice 127, the opening of which is controlled by movement of valve 98 to progressively close off or open flow through the passage 128 which is normally open to exhaust past the right edge of the valve 97. The valve 99 is preferably adapted to provide a control pressure in the chamber 115 slightly less than full line pressure when the engine is running at its maximum horsepower speed which control pressure is equaled by the control pressure in chamber 125 when the valve 98 is moved from the position shown to its maximum travel position toward the left substantially closing the variable orifice 127. When the valve 98 is in the position shown with the variable orifice 127 relatively wide-open, the pressure in the chamber 125 is adapted to slightly exceed the pressure in chamber 115 when the engine is running at idling speed thereby assuring return of the transmission to its lowest speed ratio when the vehicle is brought to a stop with the engine idling. In between such extreme positions, the valve 98 will vary the opening of orifice 127 to provide intermediate pressures corresponding to all of the intermediate response pressures in chamber 115 arising from engine speeds between idling and maximum horsepower speed. When the pressure in chamber 125 overbalances that in chamber 115, valve 95 will shift to the left connecting line pressure (or such reduced fraction thereof as may be established by the effective orifice flow past the tapered lands 129) to the passage 59a and associated cylinder 60 to effect a ratio change increasing engine speed, while if the pressure in chamber 115 overbalances that in chamber 125, valve 95 will shift to the right admitting like pressure to the passage 57a and associated cylinder 58 to establish a ratio change decreasing engine speed. In either case excess fluid from the low pressure cylinder is discharged through passage 130 and check valve 100, loaded by spring 121 to a value corresponding to required belt tensioning pressure.

When the engine is started and is idling with the vehicle at a standstill, the valve 95 will be biased slightly to the left to maintain the transmission in its lowest speed ratio position. When the accelerator is depressed from the position shown, a cam 132 is actuated through suitable linkage 133 to cause a cam surface 134 to move the valve 98 progressively to the left while the engine throttle is opened by distinct coordinated means such as the engagement of a separate cam end 135 with a throttle actuating lever 136. Each position of the cam surface 134 will accordingly correspond to a position of the valve 98 which will establish a particular control pressure in the chamber 125 corresponding to a balanced pressure in the chamber 115 resulting from one particular engine speed, while the engine throttle will be coordinately opened (preferably rapidly during the initial travel of the accelerator) to a position corresponding to the optimum power output for such engine speed.

Thus, the accelerator travel and directly responsive cam surface 134 may be considered as representing progressive positions of power demand establishing control pressures in the chamber 125 which will correspond to progressive increments in engine speed and resulting response pressure in the chamber 115 optimum in each case for meeting each increment in power demand. If the engine is running at a speed which is too low to meet the power demand, the valve 95 will become biased to the left to produce a transmission ratio which will permit the engine speed to increase, while if the engine is running at a speed in excess of the optimum speed required to meet a given power demand, the valve 95 will become biased to the right to establish a change in transmission ratio which will decrease engine speed. It will be seen that this control will establish and maintain an engine speed corresponding to a given power demand as indicated by a given position of the accelerator and automatically coordinate the transmission ratio with the vehicle speed as required to maintain such engine speed.

As an illustration of the operation of the control in starting from a standstill, let it be assumed that the accelerator is depressed and held at a position corresponding to a 50 H.P. demand and that the optimum engine speed for producing 50 H.P. is 1500 r.p.m. with the engine throttle substantially wide-open. When the accelerator is first depressed to such 50 H.P. position, a control pressure in chamber 125 will be established corresponding to a balanced response pressure in chamber 115 effected by an engine speed 1500 r.p.m. After the forward clutch is initially engaged under the influence of pressure increasing with the square of engine speed, the vehicle will accelerate in its lowest speed ratio until an engine speed of 1500 r.p.m. is reached, whereupon the valve 95 will assume a balanced position. Thereafter as the vehicle continues to accelerate an increase in engine speed above 1500 r.p.m. will bias the valve 95 toward the right producing an increasing speed ratio in the transmission to substantially maintain an engine speed of 1500 r.p.m.

Now assume that, having accelerated with 50 H.P. to a desired sustained driving speed of 50 m.p.h. requiring a sustained road load power of 25 H.P. which may be delivered with high torque at an optimum engine speed of 800 r.p.m., the accelerator is now raised to a 25 H.P. demand position. The 1500 r.p.m. response pressure will now overbalance the valve 95 to the right introducing shifting pressure to passage 57a to effect an overdrive ratio which will permit the engine to run at 800 r.p.m. which will in turn result in a new balanced condition of the valve 95 corresponding to the new power demand. If a hill is now encountered requiring 35 H.P. for sustained vehicle speed which may be delivered with high torque at an optimum engine speed of 1050 r.p.m. and the accelerator is accordingly depressed to a 35 H.P. position, the valve 95 again becomes biased to the left to produce a corresponding increase in engine speed while the vehicle speed remains constant. It will be noted that throughout all of the above changes in power demand, engine speed and vehicle speed the engine throttle may have undergone little if any change from a substantially open condition corresponding to optimum performance at the various horsepower output levels.

If the accelerator is now moved back to the position shown in the drawing corresponding to an engine speed slightly above idling, the throttle will be closed and the valve 95 will become biased to the right to produce the highest speed (overdrive) condition of the transmission which will prevail while the vehicle decelerates to a speed approaching engine idling speed in high speed ratio whereafter further deceleration of the vehicle will again bias the valve 95 to the left to decrease the speed ratio as required to maintain the engine speed slightly above idling speed as the vehicle approaches a stop, the clutch being released during the final deceleration of the vehicle after engine idling speed in lowest speed ratio is reached.

In order to obtain desired engine braking under accelerator control, a manually adjustable stop lever such as 137 may be moved by an adjustment screw 138 (preferably mounted on the dashboard) to provide an additional release travel of the accelerator beyond closed throttle position bringing into operation an engine braking cam surface 138 for permitting the valve 98 to move to the right from the position shown in the drawing thereby progressively closing an orifice 139 at the end of passage 140. Line pressure in passage 141 passing through a relatively small fixed orifice 142 communicates with the left end of valve 97 and normally exhausts through the relatively wide-open variable orifice 139 with a resulting pressure on the valve 97 insufficient to overcome a spring 143 urging such valve to its left-hand position. However, when the orifice 139 is reduced in area by the movement of the valve 98 to the right under the control of cam surface 138, pressure in the line 140 builds up to move valve 97 to the right against spring 143 thereby closing off the exhaust port to passage 128 and building up control pressure in the chamber 125 moving the valve 95 to the left to establish a lower speed ratio necessary for desired engine braking. When the deceleration of the vehicle reaches a value corresponding to the effective opening of orifice 139, a decelerometer control such as suspended weight 144 operating on lever 145, pivoted at 146 moves the valve 97 back toward its left-hand position to again permit exhausting of pressure from passage 128. Thus, for any given position of the accelerator in the engine braking range represented by the cam surface 138, the speed ratio of the transmission will be decreased until sufficient engine braking is effected to meet the indicated demand which may be adjusted to any desired maximum (through screw 138) when the accelerator is fully released.

It will thus be understood that in both the cases of controlling engine power and engine braking, the present control operates automatically to coordinate the transmission ratio with the prevailing vehicle speed to provide an engine speed best suited for the particular propelling power or braking power requirement as indicated by the accelerator position.

In order to take full advantage of the positively controllable, continuously variable shifting characteristics of the present transmission, and the automatic control features described above, a relatively wide range of ratio variation is desirable as may be best understood by reference to certain graphs illustrating the application of the transmission to the requirements for a typical passenger car. In FIG. 6, a series of constant horsepower curves in 5 H.P. increments between 5 and 110 H.P. have been plotted on an engine r.p.m. versus torque graph. Also plotted on such graph are typical 6-cylinder and 8-cylinder engine full torque curves as well as the road-load horsepower curve for a typical passenger car at related vehicle speeds based on direct drive with a 3.90 axle ratio. From such graph it is apparent for example, that a typical 8-cylinder engine passenger car operating in conventional direct drive at 30 miles per hour over a level road may operate at approximately 20 percent of full engine torque and that even at 60 miles per hour where upwards of one-third of full engine torque is required with the engine operating at approximately 2900 r.p.m., the same power inherently could be delivered under full torque operation with the engine operating at slightly over 1000 r.p.m.

Figure 7:
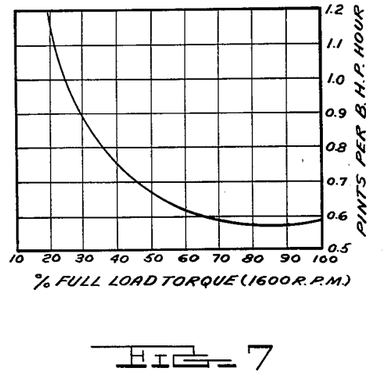
FIG. 7 is a graph showing the relationship of fuel consumption to torque load for a typical engine.
Figure 8:
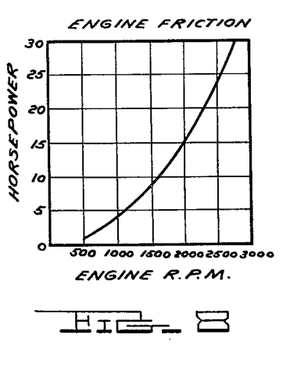
FIG. 8 is a graph showing the increase of engine friction horsepower with engine speed for a typical passenger car engine.

With the limitation of a fixed final drive ratio eliminated, and a wide range of uniformly efficient continuously variable ratios available, as in the present transmission, an approach may be made to providing an optimum engine speed for meeting each level of power demand independent of vehicle speed and without depending on torque reserve for meeting acceleration demands. In determining the optimum engine speed for meeting any given power requirement independent of torque reserve for acceleration, engine operation at a relatively high torque load is indicated by several factors: Engine operation is inherently more efficient at relatively high torque load, as indicated by the graph of FIG. 7 illustrating percentage of full load torque plotted against fuel consumption for a typical engine opearting at 1600 r.p.m.; it involves less engine friction and engine wear, as indicated in the graph of FIG. 8 wherein engine friction horsepower is plotted against engine r.p.m. for a typical 8-cylinder engine; and it generally involves a much quieter, smoother operation than in the case of conventional low torque, high r.p.m. operation. Taking into consideration all such factors, an optimum engine speed versus horsepower curve can be plotted for any make of engine which would be developed at a relatively high percentage of full engine torque throughout most of the range. While considerations of harmful engine "lugging," detonation, crank shaft bearing capacities, etc. may qualify the desirability of full torque operation to some extent, particularly in the lowest engine speed ranges, a comparison of the general performance characteristics of full torque operation against a conventional final drive operation will indicate the substantial inherent advantages attending high torque operation as well as the range of ratio variation required for such operation. Based on the full torque curves (estimated below 800 r.p.m.) and the road-load requirements shown in FIG. 6, the over-all transmission ratios required for full torque operation are compared in FIG. 9 with a typical fixed direct drive 3.90 axle ratio on a graph showing vehicle speed versus engine speed. Also shown are the over-all ratios required to maintain respective full horsepower engine speeds of 3500 and 3800 in the case of typical 6-cylinder and 8-cylinder engines, as well as the full torque horsepower available from such engines at various vehicle speeds in conventional fixed direct drive operation. The over-all ratios of 12 to 1 and 1.33 to 1 shown in dotted line represent the ratios obtainable with the transmission pulley sets shown in FIGS. 1 and 2 (providing an over-all ratio change of 9 to 1) when combined with a 4 to 1 axle ratio and are seen to meet substantially the requirements for both full torque road-load operation and maximum power operation for all vehicle speeds. From this graph it is apparent that full torque engine speeds in the range of ⅓ to ½ of conventional engine speeds are adequate to deliver road-load power for all normal driving speeds and that such full torque minimum engine speed operation can be produced with over-all transmission and axle ratios in the range of 1⅓ to 1 to 2 to 1.

Figures 10, 12:
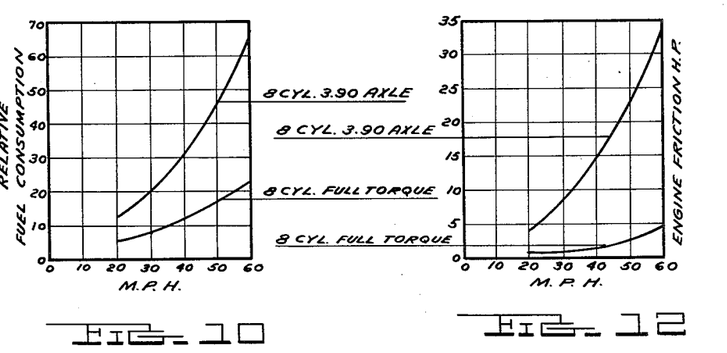
FIG. 10 is a graph comparing relative fuel consumption for road load operation in a conventional fixed final drive ratio with that obtainable through full torque operation.
FIG. 12 is a graph comparing relative engine friction encountered in a conventional fixed final drive ratio with that obtaining under full torque operation.
Figure 11:
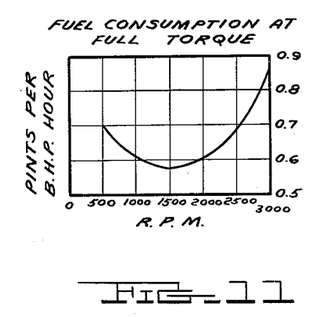
FIG. 11 is a graph showing the effect of engine speed on fuel consumption at full torque output.

The effect of full torque as compared to conventional direct drive road-load operation on relative fuel consumption is shown in FIG. 10 on the basis of the combined effects of relative efficiencies attending fractional and full torque loading as shown in FIG. 7, relative engine friction horsepower losses as shown in FIG. 8, and the effect of engine speed on fuel consumption at full torque as shown in FIG. 11. From FIG. 10 it is apparent that for normal sustained driving speeds a relative fuel consumption in the range of ½ to ⅓ of conventional direct drive consumption may be expected under full torque operation.

Figure 13:
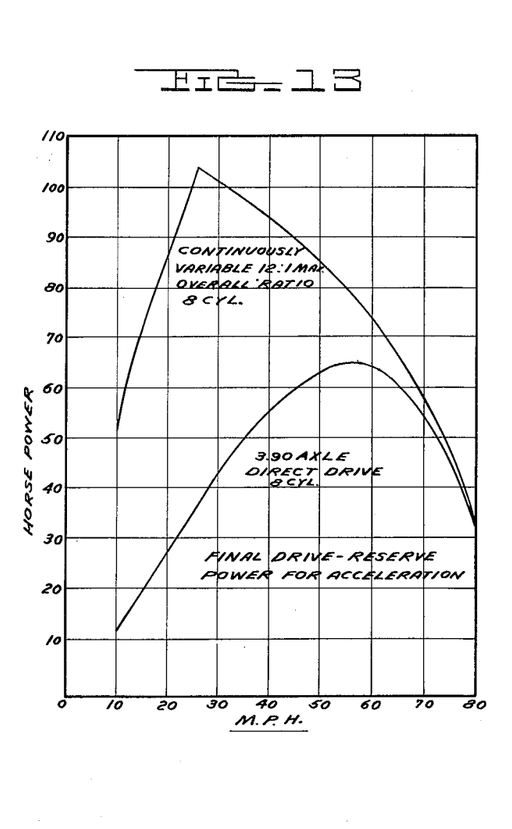
FIG. 13 is a graph comparing typical reserve torque for acceleration in a conventional final drive ratio with that obtainable through the illustrated embodiment of the present transmission.

Relative engine wear under conventional and full torque road-load operation are indicated by the comparison of engine friction in FIG. 12, while relative reserve power available for acceleration is compared in FIG. 13.

Having determined the desired over-all ratio change for a given vehicle transmission and the desired maximum pulley diameter from a space standpoint, a transmission belt may be provided to meet required maximum torque loads based on the following considerations: Where, as in the case of the transmission shown in FIGS. 1 and 2, dual pulley sets are employed the over-all ratio change will constitute the product of the ratio variation obtained in each pulley unit, and, as in the present case where equal ratio variation is obtained in each unit, the minimum effective pulley diameter will be equal to the maximum effective pulley diameter divided by the fourth root of the over-all desired ratio variation.

The most critical belt load will occur at the point where the driving side of the output belt 27 enters the countershaft pulley set C when minimum speed ratio is combined with maximum engine torque. At this point and under such conditions, the maximum torque multiplication through the first set and maximum combination of bending and load pull tensile stresses are applied to the spring steel band and such stresses form the basis for computing the ultimate belt proportions. The total load pull in the band at such point will be the product of the maximum engine torque times the ratio in the first pulley set divided by the effective torque arm (minimum effective pulley radius) plus the belt tension on the slack side.

In order to provide a band of adequate strength and minimum width to meet these requirements, a number of factors are involved. The change in stress in the surface fibers of the band in passing from a straight to minimum diameter curvature condition will be equal to the thickness of the band times the modulus of elasticity divided by the minimum pulley diameter. The tensile stress from load belt pull will be equal to the total pull divided by the cross-sectional area of the belt. The most effective belt thickness will be that at which the total change in outer fiber stress from bending between straight and minimum pulley radius is equal to the stress arising from belt pull, since any increase in thickness beyond such point will produce an increase in bending stress exceeding the decrease in tensile stress arising from increased cross-sectional area, while any reduction in thickness from such point will result in a decrease in bending stress less than the increase in tensile stress arising from a reduction in cross-sectional area.

Another factor which may be employed to increase the usable strength properties of the band material is to roll the band during fabrication to a natural or relaxed curvature equal to twice the minimum radius of the pulley. In this manner the tensile stress in the outer fibers arising from bending (which when added to the tensile stress arising from load belt pull forms the critical stress), may be reduced by one-half as compared with the bending tensile stress arising in the case of band material having a relaxed straight condition.

A third factor which may be employed to still further increase usable physical properties of the band is to roll the band material during fabrication in a manner such as to impart equal compressive stresses in the outer fibers when the band has a curvature corresponding to twice the minimum pulley radius. While such initial compressive stresses in the outer fiber will produce corresponding initial tensile stresses in the center fibers, the bending tensile stresses in the center fibers will be of a smaller order than in the outer fibers, and the maximum tensile stresses in the outer fibers, which ultimately determine the fatigue strength limitations of the band, will be reduced thereby permitting a greater proportion of the total allowable fatigue stress to be allocated to effective load belt pull.

Figures 14, 15, 20, 22:
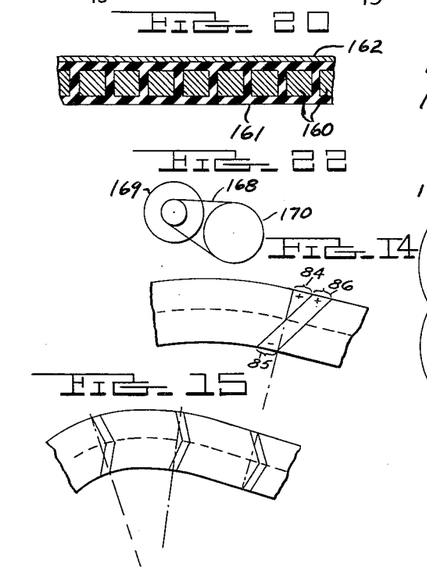
FIG. 14 is a stress diagram applied to an enlarged fragmentary section of the driving belt.
FIG. 15 is a similar stress diagram showing the effect of compressive prestressing in the outer surface.
FIG. 20 is an enlarged fragmentary transverse sectional view of a further modified belt construction wherein the steel struts are fully encased in rubber.
FIG. 22 is a schematic view of an optional pulley arrangement employing only two opposed sets of variable V pulleys.

This is illustrated graphically in FIGS. 14 and 15 showing enlarged edge views of a band under curved and straight conditions. In FIG. 14 bending tensile and compressive stress for a naturally straight band at the point of maximum curvature will be maximum at the surfaces as indicated at 84 and 85 and will have added thereto substantially uniform tensile stress 86 arising from load belt pull. If referring to FIG. 15, the band is provided with a natural curvature of double the minimum radius and equal compressive stresses in the surface fibers as in the center stress diagram, increased curvature as shown at the left will initially relieve the compressive stress at the outer surface fibers and thereby provide higher allowable load pull tensile stresses within fatigue limits; or decreased curvature as shown at the right will initially relieve compressive stress at the inner surface fibers thereby similarly providing higher allowable load pull tensile stresses.

Allowable fatigue stresses in the order of 100,000 to 200,000 p.s.i. may be provided in high quality spring steel depending on the chemical composition, heat treatment, hot and cold working procedures, quality of surface finish and band thickness. As a specific example of determining band thickness, and width, let it be assumed that it is desired to provide a transmission for 200 lb. ft. maximum engine torque with 9:1 over-all ratio variation employing equal dual sets of 10" maximum diameter pulleys using a uniform endless band material having an allowable fatigue stress of 150,000 p.s.i. and a pulley face angle (later discussed in detail) requiring a 10% back tension. The ratio variation in each pulley set will be 3:1 calling for a minimum pulley diameter of 5.78" or radius of 2.89". A change in surface fiber stress of 75,000 p.s.i. in passing from a straight to a 2.89" radial curvature will occur with a band thickness of .0144" (assuming 30 million for the modulus of elasticity). If the band is rolled to a natural radial curvature of 5.78", the maximum bending tensile stress will be 37,000 p.s.i. (neglecting any initial outer fiber compressive stress) and the allowable stress allocable to load belt pull will be 112,500 p.s.i. permitting a band width slightly under one inch to accommodate a gross maximum tight side belt pull of 1600 pounds.

Figure 9:
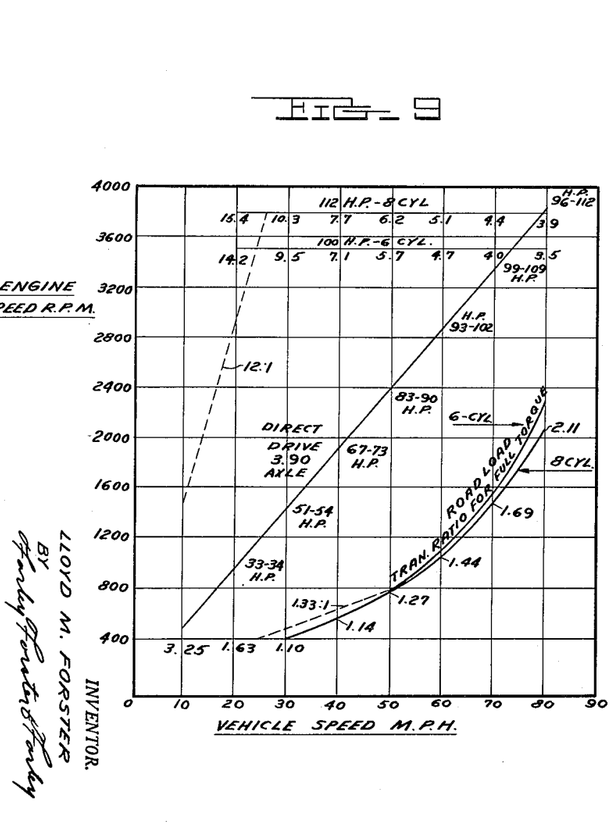
FIG. 9 is a graph comparing overall transmission ratios required for full torque road load and maximum horsepower operation with a typical fixed final drive ratio operation.

It will be understood that the maximum belt pull will occur only under maximum acceleration in lowest speed ratio when the peak torque engine speed is reached, corresponding with reference to FIG. 9 to 2000 r.p.m. in 12:1 over-all ratio at 12 miles per hour. If maximum acceleration continues, engine torque will fall off until peak horsepower is reached after which ratio change will reduce torque multiplication and thereby further reduce belt pull. On the other hand if acceleration continues at 2000 r.p.m. corresponding to peak torque, ratio change will occur to reduce belt pull. Accordingly, at normal as well as top road speeds under either full power or road load operation a belt pull in the order of 75% of maximum is the highest encountered.

The steel band 80 is preferably constructed as an endless, seamless, jointless band from material having uniformly high fatigue strength characteristics. While the precise method of construction for such band does not lie within the scope of the present application, one suitable method involves the use of seamless tubing formed from a solid billet. Rings cut from such tubing including sufficient material to complete the finished band may be progressively annealed and roller to finished width and length. In order to provide compressive stresses in the surface fibers and a relaxed natural radius double the minimum pulley radius, appropriate finish roll sizes may be employed.

A minimum belt width (limited by the space between pulley faces when the belt is running at its outermost position) is desirable to minimize the beam span of the supporting struts thereby permitting a minimum strut section and maximum number of struts and driving contact points. In order to avoid high columnar bending stress from pulley face pressure end loading of the struts, a minimum depth of strut section in the order of ⅛ belt width is preferred, and if a simple square strut section is employed with minimum spacing to accommodate flexure, the resulting combined maximum stress from belt surface pressure and eccentric end loading will be well within allowable stresses for available steel strut materials. As applied to the previous example, eight struts per inch of belt length would provide a minimum of 60 struts or 120 points of contact to transmit frictional drive between belt and pulley faces.

Another means for further increasing belt load capacity consists in providing one or more reinforcing bands outside of the band carrying the struts capable of absorbing a part of the tensile load arising from belt pull. While any such outer band will travel at a slightly higher circumferential speed in passing around the pulleys causing a slight inter-band slippage at points of entering and leaving the pulley curvature, such slippage will be negligible from a wear standpoint particularly when the belt runs in oil as is contemplated in the present transmission.

Referring again to FIGS. 1 and 2, the two belts 26 and 27 are maintained in true running alignment throughout all ratio positions on the respective pulleys by providing a slight convex curve on the outer faces 79 with which the belts make driving contact. Such curve is necessary due to the fact that in the extreme ratio pulley positions, a relatively small radially inward movement of a belt from its outer position on one pulley set will be accompanied by relatively larger outward radial movement of such belt from its inner pulley position on the opposed pulley set. Thus if straight pulley faces were used, a greater relative lateral shifting of the belt would occur at the smaller effective radius pulley set. Accordingly, in order to provide equal lateral shifting of the belt at the opposed pulley sets as required for true running alignment throughout all ratio changes, the slope of the pulley face at the smaller effective radius must be less than the slope at the larger effective radius by an amount sufficient to compensate for the difference in rate of change of effective radial positions in order to produce equal horizontal components of movement. The slope of the opposed pulley sets at the point where the belt is running at 1 to 1 ratio is of course the same since at this position the rate of radial change is equal at both pulley sets.

Expressed more precisely, the ratio of the instantaneous rates of change of effective radius of the respective opposed pulley sets in moving from any given belt position must equal the ratio of the cotangents of the slope of the respective pulley faces at the contact points of such belt position. The rates of change of effective radius will be a function of the maximum and minimum pulley radii and the center spacing of the pulley sets as may be computed from belt length formulae or graphically plotted from a layout of a series of belt positions.

The starting point in determining the actual curve of any given pulley face will be the angle at the minimum radius contact point for the belt. This angle may be selected close to the minimum nonsticking angle for the particular materials and surface conditions of the pulley faces and contacting struts in order, both to minimize the necessary back tension to avoid belt slippage, as well as to minimize the necessary belt width to accommodate a relatively large ratio change. By employing hardened steel surfaces for both the pulley faces and contacting struts together with adequately smooth finishes, a minimum nonsticking angle in the order of 9° (included angle 18°) may be employed for the pulley faces although somewhat larger angles may be employed to accelerate shifting speeds.

The preferred belt construction shown in the enlarged views of FIGS. 3 and 4, as previously mentioned, comprises an endless flexible spring steel band 80 to the inner surface of which are attached transverse steel struts 81 which are adapted to engage opposed pulley faces at the upper edges 82 to establish frictional driving contact and to support the steel band 80 transversely against buckling loads. The struts 81 may be attached to the inner surface of the belt 80 by an innerlay of oil resistant rubber or rubber impregnated fabric 83 vulcanized to the respective struts and belt surfaces. By limiting the contact between struts and pulley faces to the upper edge 82, peeling loads on the bond between the struts and rubber innerlay are avoided and the stresses are confined to substantially pure shear stresses well within allowable rubber to metal bond loads.

Alternative means for connecting the struts to the band are shown in FIGS. 16 to 21. In the modification of FIGS. 16 and 17 the edges of band 80a are notched with semicircular grooves 150, and the strut ends are formed, as in upset dies, with semicircular projections 151 for drivingly engaging such grooves, a lip 152 being provided to retain the struts on the belt when not engaged by the pulley faces. Both projections 151 and lips 152 may be preformed and the band assembled to the struts by transverse arching. An arcuate strut face 153 is preferred having a radius equal to the minimum effective pulley radius in order to avoid band contact with strut edges producing such more severe localized bending stresses as would occur with flat strut faces. The beveled ends 154 of the struts may be compressively recessed at the center 155 to cause material flow in the upset dies thereby providing two driving contact points 156 for engaging the pulley faces along the lines of belt pull.

Figure 18:
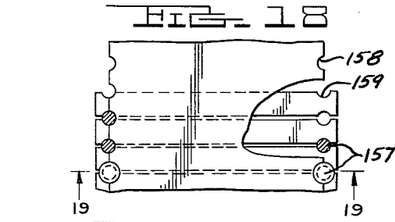
FIG. 18 is an enlarged fragmentary face view of another modified belt construction employing a mechanical drive connection between band and struts.
Figure 19:
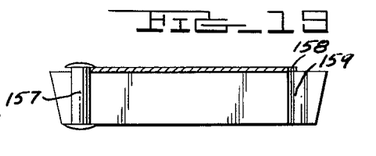
FIG. 19 is a sectional view taken along the line 19—19 of FIG. 18.

A similar mechanical drive connection between struts and band is provided in the modification of FIGS. 18 and 19 employing in this case headed pins or rivets 157 to engage semicircular grooves 158 in the belt edge and 159 in the struts. One end of the pins (preferably the lower) may be headed during assembly, or both heads prefabricated and the belt assembled by transversely arching the band.

FIG. 20 shows a modification similar to FIGS. 3 and 4 wherein the struts 160 are fully encased in rubber 161 vulcanized to the band 162. Somewhat greater strut spacing is required to provide adequate belt flexibility, although shear loading of the rubber is reduced as compared with the single face bonding of FIGS. 3 and 4.

Figure 21:
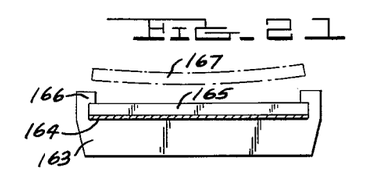
FIG. 21 is an enlarged transverse sectional view of another modified belt construction employing struts secured to the driving band by frictional engagement.

FIG. 21 shows a further modification wherein drive is transmitted from struts 163 to band 164 through frictional engagement produced by a spring clamping member 165 engaging suitably recessed upper strut ends 166. As an alternative, simple strut and spring clamping elements having uniform section throughout may be held by a small endless band encircling their projecting ends on either side of the belt band. A relaxed arcuate form as shown at 167 for the clamping member permits uniform clamping pressure to be established between the center of the preferred arcuate upper face of the strut and the clamping member throughout the width of the belt band.

Figure 23:
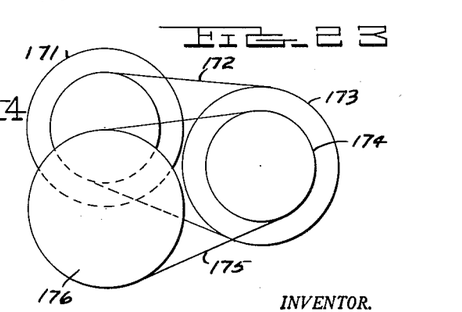
FIG. 23 is a schematic view of a further optional pulley arrangement similar to that shown in FIGS. 1 and 2 but with the output set on a different axis than the input set.

It will be understood that alternate variable pulley arrangements are feasible, such as shown schematically in FIG. 22, employing a single belt 168 between an input pulley set 169 and output pulley set 170 in which case fluid pressure actuation may be achieved by locating one of the fluid pressure cylinders on the input pulley set, as in FIG. 1, and the other diagonally opposed on the output pulley set; or a dual belt pulley arrangement similar to that of FIGS. 1 and 2 may be provided with the output shaft on a different level than the input shaft as shown in FIG. 23 wherein an input pulley set 171 drives belt 172 and countershaft pulley set 173 while a second countershaft pulley set 174 drives belt 175 to a lower level output pulley set 176.

Figure 24:
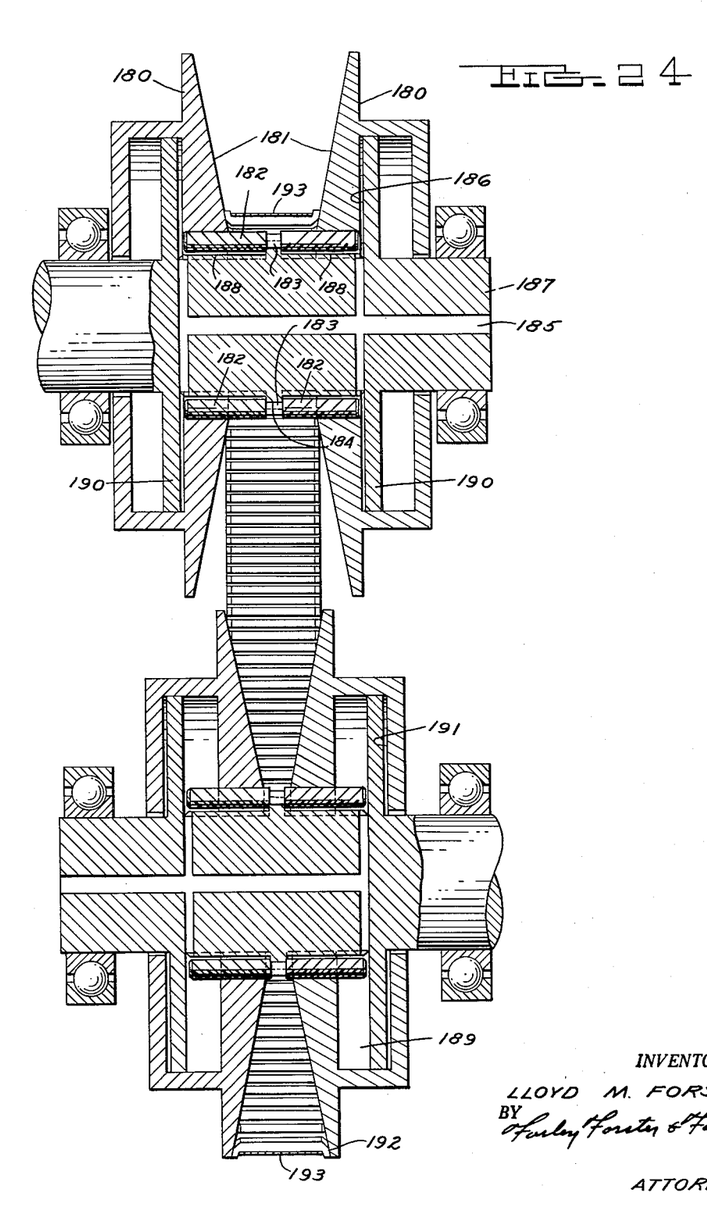
FIG. 24 is a diagrammatic view of a further optional pulley arrangement.

Referring to FIG. 24 it will be seen that fluid pressure actuated pulleys 180 with straight face profiles 181, rather than dished as in FIGS. 1 and 2, may be employed by providing means for equalizing axial movement of cooperating pulley halves so that the belt will remain in a fixed plane of action. In this modification lead screws 182 with oppositely inclined turns engage respective pulley halves and are held in axially fixed location by engagement of central shoulders 183 with a shaft ring 184 so that equal movement of pulley halves relative to the fixed plane of belt action is assured.

Fluid pressure simultaneously admitted through a common passage 185 to each pulley chamber 186 while shaft 187 is turning will simultaneously move each pulley half axially along drive splines 188 while belt tensioning pressure in opposite pulley chambers 189 will insure driving engagement without belt slippage. Controlled leakage past axially fixed piston elements 190 will maintain outer chambers 191 filled with fluid under centrifugal pressure to balance centrifugal pressure in the inner chambers 186 thereby rendering pulley actuating pressure independent of pulley speed.

With the constant angle pulley faces permitted by this arrangement, the strut ends 192 may be beveled to match the pulley angle providing line contact for which case it is desirable to locate the centerline of contact on the centerline of the band 193, as shown, in order to avoid peeling loads between struts and band.

It will be understood that this modification is shown in diagrammatic form with no attempt to illustrate assembly joints, fluid seals, antifriction drive splines, etc. all of which may be readily incorporated in an operating unit by one skilled in the art following the present disclosure.

It will be also understood that numerous other modifications in the detailed constructions of the belt, pulley and control system disclosed herein may be resorted to without departing from the scope of my invention as defined in the following claims.

I claim:
1. A transmission V belt comprising an endless, seamless, jointless, flexible flat spring steel band of uniform width, thickness and strength throughout, rigid transverse steel struts adapted to engage opposed V pulley faces and support the inner face of said band during strut engagement with said pulley faces, and a rubber interlay respectively bonded to said struts and the inner surface of said band adapted to secure said struts to said band and transmit driving torque therebetween.

2. A continuously variable transmission pulley system comprising an input shaft, an output shaft, a countershaft, an input V pulley set drivingly connected to said input shaft having one axially fixed and one fluid pressure actuated axially movable pulley half, a countershaft V pulley set having one axially fixed and one axially movable pulley half in diagonally opposed relationship to the fixed and movable pulley halves of said input pulley set, a second countershaft V pulley set having one axially fixed and one axially movable pulley half, the latter being in adjacent and operatively integral relationship to the axially movable pulley half of said first countershaft pulley set, and an output V pulley set drivingly connected to said output shaft having one axially fixed and one fluid pressure actuated axially movable pulley half in diagonally opposed relationship to the fixed and movable pulley halves of said second countershaft pulley set, the opposed V pulley faces of each of said pulley sets being progressively dished from a maximum included angle at the outer operating radius to a minimum included angle at the inner operating radius, the form of said dished faces being such that the ratio of the instantaneous rates of change of effective radius of the respective opposed pulley sets in moving from any given belt position will substantially equal the ratio of the co-tangents of the slope of the respective pulley faces at the effective contact radii of such belt position.

3. A continuously variable transmission comprising an input shaft, an output shaft, a countershaft, an input V pulley set drivingly connected to said input shaft having one axially fixed and one fluid pressure actuated axially movable pulley half, a countershaft V pulley set having one axially fixed and one axially movable pulley half in diagonally opposed relationship to the fixed and movable pulley halves of said input pulley set, a second countershaft V pulley set having one axially fixed and one axially movable pulley half, the latter being in adjacent and operatively integral relationship to the axially movable pulley half of said first countershaft pulley set, an output V pulley set drivingly connected to said output shaft having one axially fixed and one fluid pressure actuated axially movable pulley half in diagonally opposed relationship to the fixed and movable pulley halves of said second countershaft pulley set, the opposed V pulley faces of each of said pulley sets being progressively dished from a maximum included angle at the outer operating radius to a minimum included angle at the inner operating radius, and a pair of transmission V belts operating between said opposed V pulley sets, each V belt including an endless flexible flat spring steel band, and rigid transverse steel struts adapted to engage the opposed V pulley faces and support the inner face of said band during strut engagement with said pulley faces, the ends of said struts being beveled to provide frictional driving contact at points immediately adjacent the line of pull of said band.

4. A control system for a throttle modulated, variable power engine driven continuously variable transmission comprising an operator control for varying power demand, fluid pressure actuated means for increasing the output speed ratio of said transmission, fluid pressure actuated means for decreasing the output speed ratio of said transmission, a source of actuating fluid pressure, separate fluid passages leading from said source of actuating fluid pressure to said respective fluid pressure actuated means, means for establishing a control pressure increasing with engine speed, means for establishing a control pressure increasing with power demand, differential valve means oppositely responsive to said respective control pressures for controlling fluid flow through said passages, said differential valve means opening said passage for decreasing output speed ratio when said power demand control pressure overbalances said engine speed control pressure, said differential valve means opening said passage for increasing output speed ratio when said engine speed control pressure overbalances said power demand control pressure, and means responsive to said operator control for providing an optimum throttle opening for every power demand and engine speed corresponding to a balanced condition of said differential valve means.

5. A fluid pressure actuated continuously variable transmission for a throttle modulated variable power engine driven vehicle comprising an engine driven input shaft, an output shaft, a countershaft, an input V pulley set drivingly connected to said input shaft having one axially fixed and one fluid pressure actuated axially movable pulley half, a countershaft V pulley set having one axially fixed and axially movable pulley half in diagonally opposed relationship to the fixed and movable pulley halves of said input pulley set, a second countershaft V pulley set having one axially fixed and one axially movable pulley half, the latter being in adjacent and operatively integral relationship to the axially movable pulley half of said first countershaft pulley set, an output V pulley set drivingly connected to said output shaft having one axially fixed and one fluid pressure actuated axially movable pulley half in diagonally opposed relationship to the fixed and movable pulley halves of said second countershaft pulley set, the opposed V pulley faces of each of said pulley sets being progressively dished from a maximum included angle at the outer operating radius to a minimum included angle at the inner operating radius, a pair of transmission V belts operating between each of said opposed V pulley sets, each V belt including an endless flexible flat spring steel band and rigid transverse steel struts adapted to engage opposed V pulley faces and support the inner face of said band during strut engagement with said pulley faces, a source of actuating fluid pressure, separate fluid passages leading from said source of actuating fluid pressure to each of said fluid pressure actuated axially movable pulley halves, means for establishing a control pressure increasing with engine speed, means for establishing a control pressure increasing with power demand, differential valve means oppositely responsive to said respective control pressures for controlling fluid flow from said source of actuating fluid pressure to either of said passages, said differential valve means opening actuating flow to move said output shaft fluid pressure actuated axially movable pulley half toward the output shaft fixed pulley half when said power demand control pressure overbalances said engine speed control pressure or to move said input shaft fluid pressure actuated axially movable pulley half toward said input shaft fixed pulley half when said engine speed control pressure overbalances said power demand control pressure, a source of belt tensioning fluid pressure, means for admitting said belt tensioning fluid pressure to both of said passages when said differential valve is in a balanced condition and to maintain said belt tensioning fluid pressure in one of said passages when ratio shifting actuating pressure is admitted to the other of said passages, and means responsive to said operator control for providing an optimum throttle opening for every power demand and engine speed corresponding to a balanced condition of said differential valve means.

6. A transmission V belt comprising an endless, flexible flat metal band, and rigid transverse metal struts attached to said band with a plastic bonding material, said struts being adapted to engage opposed V pulley faces and support the inner face of said band during said engagement.

7. A transmission V belt comprising an endless, flexible flat metal band, and rigid transverse metal struts encased in a plastic material bonded to the inner surface of said band, said struts being adapted to engage opposed V pulley faces and support the inner face of said band during said engagement.

8. A transmission V belt comprising an endless, flexible flat metal band, driving apertures in said band, and rigid transverse metal struts attached to said band, said struts having protrusions adapted to engage said driving apertures, the ends of said struts being adapted to engage V pulley faces, and said struts being adapted to support the inner face of said band during said pulley engagement.

9. A transmission V belt comprising an endless, flexible flat metal band, notches in the side edges of said band, and rigid transverse metal struts adapted to drivingly engage said notches, frictionally engage V pulley faces and support the inner face of said band during pulley engagement.

10. A transmission V belt comprising an endless flexible flat metal band, rigid transverse metal struts adapted to frictionally engage opposed V pulley faces and support the inner face of said band during said pulley engagement, and frictional clamping means engaging the ends of said metal struts for attaching them to said band.

11. A V pulley transmission V belt comprising an endless flexible flat metal band, and rigid transverse metal struts attached to said band, said struts being adapted to engage opposed V pulley faces at points immediately adjacent the line of pull in said band and to support the inner face of said band during said pulley engagement.

12. A transmission V belt characterized by an endless flexible flat metal band having compressively pre-stressed surface fibres and tensiley pre-stressed internal fibres, and a thickness adapted to produce a change in surface bending stresses in flexing from straight to minimum operating radius of substantially the same order of magnitude as the unit tensile stresses arising from belt pull when operating at maximum rated capacity.

13. A continuously variable transmission characterized by opposed variable V pulleys each pulley having a single fixed and a single axially movable pulley face in diagonally opposed relationship to the corresponding elements of the opposed pulley, the opposed V pulley faces being progressively dished from a maximum included angle at the outer operating radius to a minimum included angle at the inner operating radius in a manner whereby the lateral shifting of a V belt running between opposed pulleys in changing ratio will be equal at each pulley, the form of said dished faces being such that the ratio of the instantaneous rates of change of effective radius of the respective opposed pulley sets in moving from any given belt position will substantially equal the ratio of the cotangents of the slope of the respective pulley faces at the effective contact radii of such belt position.

14. A fluid pressure actuated continuously variable transmission for a throttle modulated variable power engine driven vehicle comprising, an engine driven input shaft, an output shaft, fluid pressure actuated variable V pulley sets on said input and output shafts, V belt means for transmitting drive between said input and output V pulley sets, a source of actuating fluid pressure, fluid passages leading from said source of actuating fluid pressure to said fluid pressure actuated pulley sets, actuating pressure admitted to certain of said passages being adapted to produce an increase in output speed ratio and actuating fluid pressure admitted to other of said passages being adapted to produce a decrease in output speed ratio, means for establishing a control pressure increasing with engine speed, means for establishing a control pressure increasing with power demand, differential valve means oppositely responsive to said respective control pressures for controlling fluid flow from said source of actuating fluid pressure to said passages, said differential valve means opening actuating flow to produce an increase in output speed ratio when said engine speed control pressure overbalances said power power demand control pressure or to produce a decrease in output speed ratio when said power demand control pressure overbalances said engine speed control pressure, and means responsive to said operator control for providing an optimum throttle opening for every power demand and engine speed corresponding to a balanced condition of said differential valve means.

15. A fluid pressure actuated continuously variable transmission for a throttle modulated variable power engine driven vehicle comprising, an engine driven input shaft, an output shaft, fluid pressure actuated variable V pulley sets on said input and output shafts, V belt means for transmitting drive between said input and output V pulley sets, said V belt means including an endless flexible flat spring steel band and rigid transverse steel struts adapted to engage opposed V pulley faces and support the inner face of said band during strut engagement with said pulley faces, a source of actuating fluid pressure, fluid passages leading from said source of actuating fluid pressure to said fluid pressure actuated pulley sets, actuating pressure admitted to certain of said passages being adatped to produce an increase in output speed ratio and actuating fluid pressure admitted to other of said passages being adapted to produce a decrease in output speed ratio, means for establishing a control pressure increasing with engine speed, means for establishing a control pressure increasing with power demand, differential valve means oppositely responsive to said respective control pressures for controlling fluid flow from said source of actuating fluid pressure to said passages, said differential valve means opening actuating flow to produce an increase in output speed ratio when said engine speed control pressure overbalances said power demand control pressure or to produce a decrease in output speed ratio when said power demand control pressure overbalances said engine speed control pressure, and means responsive to said operator control for providing an optimum throttle opening for every power demand and engine speed corresponding to a balanced condition of said differential valve means.

16. A continuously variable transmission comprising, an input shaft, an output shaft, a countershaft, fluid pressure actuated variable V pulleys on said input and output shafts, a pair of variable V pulleys on said countershaft, an endless flexible flat metal band with rigid reinforcing transverse metal struts adapted to drivingly engage said input V pulley and one of said countershaft pulleys, a similar V belt adapted to drivingly engage the other of said countershaft pulleys and said output shaft pulley, said countershaft pulleys including axially fixed outer pulley faces and a common floating center element provided with inner pulley faces, said center element being shifted by change in relative belt tension induced by change in fluid pressure actuation of the axially movable input and output pulley faces.

17. A fluid pressure actuated continuously variable transmission for a throttle modulated variable power engine driven vehicle comprising, an engine driven input shaft, a coaxial intermediate shaft, and a coaxial output shaft, fluid pressure actuated variable V pulley means for transmitting drive between said input and intermediate shafts, and a fluid pressure actuated planetary gear set for transmitting drive between said intermediate shaft and said output shaft, said planetary gear set including a fluid pressure actuated gradually engageable clutch for establishing direct drive between said intermediate and output shafts and a fluid pressure actuated gradually engageable brake for establishing a reverse reduction drive between said intermediate and output shafts.

18. A control system for a continuously variable transmission comprising means for increasing output speed ratio, means for decreasing output speed ratio, control means varying with input speed, control means varying with power demand, differential means oppositely responsive to said respective control means for controlling said speed ratio changing means, said differential means being adapted to decrease output speed ratio when said control means varying with power demand predominates and to increase output speed ratio when said control means varying with input speed predominates.

19. A transmission control system for a variable speed engine having throttle responsive variable torque output, a load member, and a continuously variable transmission between said engine and load member comprising, means for varying power demand, control input means varying with power demand, control responsive means varying with engine speed, differential means oppositely acted upon by said control input and response means, transmission ratio varying means responsive to an unbalanced actuation of said differential means, and throttle actuating means coordinated with said means for varying power demand.

20. A control system for a variable power engine driven continuously variable transmission comprising, fluid pressure actuated means for increasing output speed ratio, fluid pressure actuated means for decreasing output speed ratio, a source of actuating fluid pressure, means for establishing a control pressure increasing with engine speed, means for establishing a control pressure increasing with power demand, fluid passages leading respectively from said source of actuating pressure to each of said fluid pressure actuated means, differential valve means oppositely acted upon by said respective sources of control pressure for controlling flow of actuating pressure in said respective passages, said differential valve means opening a passage for increasing output speed ratio when said engine speed control pressure overbalances said power demand control pressure, and said differential valve means opening a passage for decreasing output speed ratio when said power demand control pressure overbalances said engine speed control pressure.

21. In a power drive system for meeting varying power demands wherein input power can be increased with input speed, a continuously variable transmission for changing the ratio of input and output speeds, fluid pressure displaceable means for progressively increasing output speed ratio, fluid pressure displaceable means for progressively decreasing output speed ratio, a source of fluid pressure and passages therefrom for actuating said respective displaceable means, control means varying with input speed, control means varying with power demand, differential valve means oppositely responsive to said respective control means, said valve means having a neutral position for blocking fluid flow between said source of fluid pressure and said respective displaceable means when said respective control means produce a balanced effect on said differential valve means, said valve means having an unbalanced position for admitting fluid flow betewen said source of actuating pressure and said displaceable means for increasing output speed ratio when said control means varying with input speed predominates, said valve means having an oppositely unbalanced position for admitting flow of fluid between said source of actuating pressure and said displaceable means for decreasing output speed ratio when said control means varying with power demand predominates, thereby to establish and maintain an input speed continuously increasing with and appropriate to prevailing power demand.

22. The combination of claim 21 including means for maintaining a minimum reaction pressure in both of said fluid pressure displaceable means at all times.

23. The combination of claim 21 including means for maintaining a minimum reaction pressure in both of said fluid pressure displaceable means at all times, and means for limiting the reaction pressure in either of said displaceable means when ratio changing pressure is admitted to the other.

24. The combination of claim 21 wherein said control means varying with input speed comprises an input driven positive displacement pump discharging through orifice means providing a control pressure increasingly with input speed, and wherein said control means varying with power demand comprises a source of fixed pressure, a fixed orifice and a variable orifice decreasing with power demand, said fixed pressure discharging in series through said respective orifices providing a control pressure intermediate said orifices increasing with power demand.

25. In a power drive system for meeting variable power demands wherein input power can be increased with input speed and wherein input torque can be varied, a continuously variable transmission for changing the ratio of input and output speeds, a control system for said transmission comprising means for increasing output speed ratio, means for decreasing output speed ratio, control means varying with input speed, control means varying with power demand, differential means responsive to said respective control means for actuating either of said ratio changing means, said differential means being adapted to decrease output speed ratio when said control means varying with power demand predominates and to increase output speed ratio when said control means varying with input speed predominates, and means coordinated with said means varying with power demand for establishing an input torque appropriate to each prevailing power demand and corresponding input speed thereby to establish and maintain an input speed increasing with and appropriate to the prevailing power demand as well as a coordinated input torque.

26. The combination of claim 20 wherein input driven and output driven pumps are each adapted to supply said source of fluid pressure, and including valve means responsive to operative discharge pressure from said input driven pump adapted to freely exhaust the discharge from said output driven pump.

27. The combination of claim 17 including a valve for modulating pressure from said source to actuate said gradually engageable elements, ratio control means varying with engine speed comprising a pressure responsive variable orifice increasing in area with increasing pressure and having an initial low pressure range of relatively constant area, and an input driven positive displacement pump discharging through said orifice providing an initial low control pressure range increasing substantially with the square of input speed while said orifice means is relatively constant, said valve including means responsive to said initial low control pressure for producing an actuating pressure for said gradually engageable elements increasing with a multiple of said control pressure.

28. An engine braking control system for an engine driven vehicle equipped with a continuously variable transmission comprising, means for increasing the output speed ratio of said transmission, means for decreasing the output speed ratio of said transmission, operator control for varying power demand, said operator control having a closed engine throttle range of progressive deceleration demand, control means responsive to movement of said operator control to a given deceleration demand position for actuating said means for decreasing output speed ratio, and inertia means responsive to vehicle deceleration for limiting said last actuation in accordance with said operator control position.

29. In an engine driven automotive vehicle having an engine throttle, a continuously variable transmission for changing relative engine and vehicle speeds, means for changing the ratio in said transmission, engine speed responsive means, operator actuated means varying with power demand, means differentially responsive to said last two means for actuating said ratio changing means, each position of said operator actuated means corresponding to a predetermined engine speed appropriate for meeting the required power demand, said engine speed responsive means cooperating with said operator actuated means to automatically increase or decrease the transmission ratio as required to establish and maintain said predetermined engine speed, and means for establishing an engine throttle opening appropriate for said engine speed and power demand.

30. A continuously variable transmission and control as set forth in claim 29 wherein said means for establishing engine throttle opening produces a relatively rapid initial opening to meet relatively low power demands and maintains said throttle at substantially open positions throughout successively higher power demands, said engine speed and power output being controlled primarily by increase or decrease of the engine load through automatic ratio change.

31. The combination set forth in claim 25 wherein a pair of coordinated cam surfaces are actuated by an operator control, one of said cam surfaces, actuating said control means varying with power demand and the other of said cam surfaces actuating said coordinated means for establishing an appropriate input torque.

32. A fluid pressure actuated V pulley system comprising, a drive shaft, axially movable opposed V pulley halves drivingly connected to said shaft, fluid pressure piston means for moving said pulley halves, and means for equalizing axial movement of said opposed pulley halves.

33. A fluid pressure actuated V belt transmission comprising, a pair of parallel drive shafts, axially movable V pulley halves drivingly connected to each shaft, a driving V belt running between said pulleys, fluid pressure means for moving said pulley halves on one shaft together to increase the operating radius of said belt, fluid pressure means yieldable to permit said pulley halves on the other shaft to separate under resulting increased belt tension, and means for equalizing axial movement of opposed pulley halves.

34. A fluid pressure actuated V belt transmission comprising, a pair of parallel drive shafts, fluid pressure actuated axially movable V pulley halves drivingly connected to each shaft, said pulley halves having a constant included angle between operating faces, a driving V belt comprising an endless flexible metal band with transverse supporting metal struts beveled at their ends to the angle of said faces for line contact engagement therewith, and means for equalizing axial movement of opposed pulley halves.

35. The combination of claim 34 wherein the centerline of said contact substantially coincides with the line of band pull.

36. The combination of claim 32 including means for counterbalancing centrifugal pressure in said fluid pressure means.

37. A transmission comprising, V pulleys and a flexible metal belt having rigid transverse metal struts secured with a plastic bonding material to the inner surface only of said belt adapted to span and provide frictional driving engagement with the V faces of said pulleys.

38. The combination of claim 37 wherein the centerline of engagement of said struts with said pulleys is sufficiently close to the centerline of belt pull to avoid peeling loads on said plastic bonding material.

39. The combination of claim 37 including fluid pressure actuated means for tensioning said belt and varying the effective ratio of said pulleys.

40. The combination of claim 39 including means for maintaining the plane of operation of said belt in true normal relation to the axes of said pulleys throughout the range of variation.

41. A transmission comprising, V pulleys and a flexible metal belt subjected in operation to maximum bending stresses comprising a substantial proportion (such as in the order of one-half) of maximum total stresses, said belt having rigid transverse metal struts secured with a plastic bonding material thereto adapted to span and provide frictional driving engagement with the V faces of said pulleys.

References Cited in the file of this patent
UNITED STATES PATENTS

| | | |
|---|---|---|
| 581,770 | Reeves | May 4, 1897 |
| 596,281 | Spaulding | Dec. 28, 1897 |
| 803,810 | Cutter | Nov. 7, 1905 |
| 1,140,890 | Eloesser | May 25, 1915 |
| 1,309,245 | Coryell | July 8, 1919 |
| 2,086,804 | Hjartsater | July 13, 1937 |
| 2,150,456 | Perrine | Mar. 14, 1939 |
| 2,201,357 | Twomley | May 21, 1940 |
| 2,229,415 | Kroon | Jan. 21, 1941 |
| 2,262,678 | Heyer | Nov. 11, 1941 |
| 2,288,114 | Smith | June 30, 1942 |
| 2,295,161 | Clay | Sept. 8, 1942 |
| 2,342,604 | Shaw | Feb. 22, 1944 |
| 2,352,140 | Trott | June 20, 1944 |
| 2,920,494 | Dodwell | Jan. 12, 1960 |